A. L. JOHNSON AND A. O. ALSTEN.
PNEUMATIC CORE FOR USE IN REPAIRING TIRES.
APPLICATION FILED DEC. 9, 1914.

1,337,707. Patented Apr. 20, 1920.

Witnesses:
C. F. Wesson
C. C. Hartnett

Inventors.
A. L. Johnson.
A. O. Alsten.
By Attorneys
Southgate & Southgate

UNITED STATES PATENT OFFICE.

ALVIN L. JOHNSON AND ALFRED O. ALSTEN, OF WORCESTER, MASSACHUSETTS, ASSIGNORS OF ONE-FOURTH TO HORATIO C. GOULDING AND ONE-FOURTH TO JOHN A. ALSTEN, BOTH OF WORCESTER, MASSACHUSETTS.

PNEUMATIC CORE FOR USE IN REPAIRING TIRES.

1,337,707.            Specification of Letters Patent.      Patented Apr. 20, 1920.

Application filed December 9, 1914. Serial No. 876,368.

*To all whom it may concern:*

Be it known that we, ALVIN L. JOHNSON and ALFRED O. ALSTEN, respectively a citizen of the United States and a subject of the King of Sweden, both residing at Worcester, in the county of Worcester and State of Massachusetts, have invented a new and useful Pneumatic Core for Use in Repairing Tires, of which the following is a specification.

This invention relates to a device for use in repairing tires and similar articles. In this work it is necessary, in order to do a good job, to keep the material under a high degree of pressure during the vulcanizing process, the greater the pressure, the better the result ordinarily, and the greater the durability of the repair job.

This invention is designed to secure a maximum degree of compression with a minimum number of parts; to provide a construction in which the part that is likely to give way first in practice can be removed readily from the rest of the device and can be repaired or replaced without destroying the outside shell and without manipulating any small parts; to provide a construction which need not be made to fit the outer casing exactly but can be used to advantage even if not exactly of the right size; to provide a construction in which the outer bag part of the device will expand circumferentially to permit the removal and replacement of the inner tube and to permit the inner tube to expand it into intimate contact with the outer casing being repaired, but in which the outer bag shall not be capable of being elongated either temporarily or permanently; to provide a construction in which the ends of the outer bag shall be rigid and solid so as to receive and resist any necessary degree of pressure from within; and to provide a simple means by which the whole device can be manipulated conveniently in the mold.

Further objects and advantages of the invention will appear hereinafter.

Reference is to be had to the accompanying drawings in which—

Figure 1:
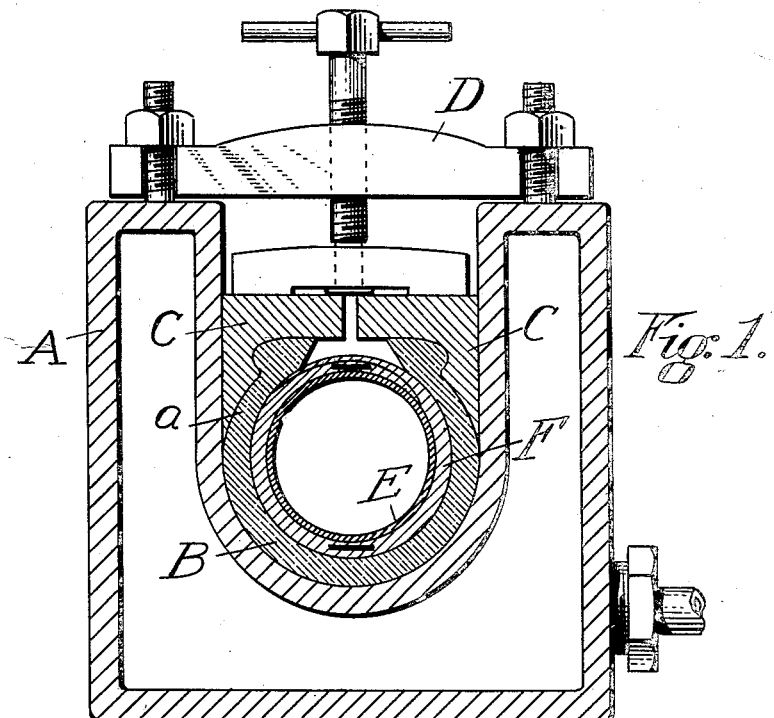
Figure 1 is a transverse sectional view of a vulcanizing mold showing a preferred embodiment of this invention applied thereto.
Figure 2:
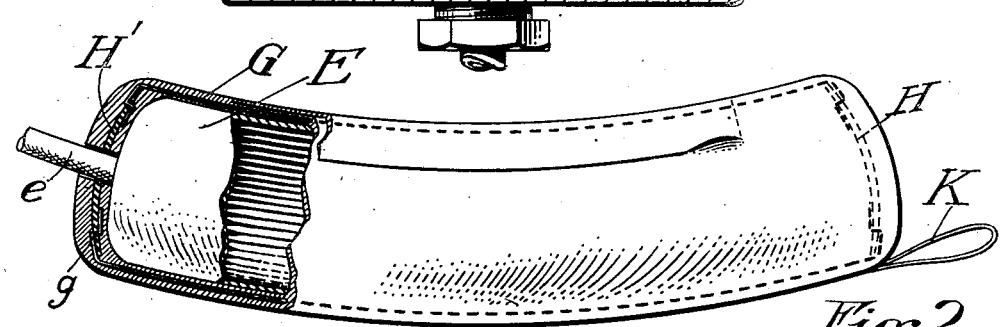
Fig. 2 is a side elevation of the core as a whole showing the end broken away and in central section.
Figure 3:
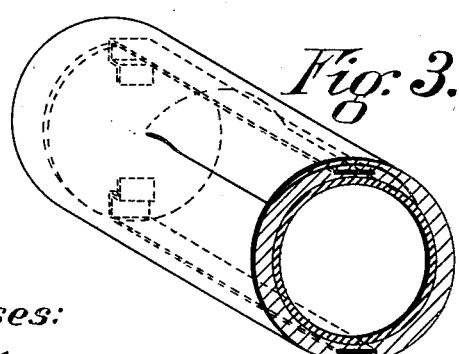
Fig. 3 is a perspective thereof transversely sectioned through the center.

This invention is intended to be used with an ordinary type of vulcanizing mold A having a mold cavity $a$ for the reception of the outer casing B of the tire to be vulcanized. Plates C are used as usual for holding the outer casing in position and a clamp D of ordinary form is shown holding these in position. The tire casing B is provided with a patch which is made up of new material to be vulcanized to the tire in this mold.

For the purpose of holding the patch and the rubber around it under compression and keeping the outside surfaces firmly in contact with the walls of the cavity $a$ an expansible pneumatic core is provided consisting of two pieces, an inner tube E and an outer bag F. The inner tube is made of good live rubber, and comparatively thin, so as to be expansible and is provided with a valve stem $e$ extending from it through which it can be inflated. The bag is formed of frictioned duck, canvas, or other similar flexible but non-expansible material which will stand the high heat employed in the vulcanizing process and protect the inner tube therefrom to some degree. It is also strong enough to hold the inner tube under ordinary circumstances and keep approximately its shape. It is made up with rounded ends and with a slit $f$ preferably arranged longitudinally. This slit is formed of two flaps $f'$ and $f^2$ constituting the overlapping ends of the slit of this outer bag and having opposite thinned edges. In this case the valve stem $e$ is shown as projecting through a perforation in one of the ends of the outer bag.

It will be seen that the two flaps $f'$ and $f^2$ overlap each other for a considerable distance. On account of this all necessity for using a separate pad or other device for guarding the opening through which the inner tube is introduced and removed is avoided and in this way a device is secured which is easy and practical to manage and there is no danger of losing any essential part of it or of having it misplaced so as to permit of a blow out. These two flaps are integrally secured together at their ends as will be seen. This prevents the ends of the flaps becoming loosened in practice and secures a durable construction which, after a great deal of use, will be of the same form as when originally made.

On account of having the longitudinal slit the bag is capable of expanding circumferentially enough to permit of its use in a tire which is somewhat larger than the bag, but it is detrimental to allow the bag to expand longitudinally and for preventing this we make the bag non-expansible longitudinally. One way of doing this is to form it of a material which will not expand longitudinally, no matter whether it will expand circumferentially or not in addition to the expansion due to the slit. We prefer, however, to introduce positive means to prevent this longitudinal expansion and for this purpose we have shown two metallic strips G embedded among the layers of the frictioned material of which the bag is formed and extending longitudinally. Any desired number of these can be used and they can be placed in any desired positions but we prefer to place them one along the concave side and the other along the convex side of the bag. The ends of these members are anchored in the ends of the bag. These ends of the bag are shown as of comparatively thick material of a rigid and hard character so as to secure hard ends which will effectively resist the longitudinal pressure from the inner tube and prevent injury to the bag at this point. In addition to this we also have shown a pair of metallic plates H and H', the latter of which is perforated to permit the passage of the valve stem e. Both of them are provided with perforations to permit the bent ends g of the strips G to be inserted through them and bent over inside. In this way the strips are anchored firmly in the solid ends of the bag. They absolutely and positively prevent any elongation of the bag due to the maintaining of the bag under high heat in the mold without external means for resisting the motion of the ends longitudinally.

Another feature of the invention is shown in the form of a loop K formed of a double piece of frictioned material constituting a part of the bag and extending therefrom at the end of the convex side. This is large enough to permit the insertion of the hand and it is placed in such position that the bag can be drawn along in the mold in a convenient manner.

In the use of the device the puncture or blow-out is treated in the usual way so that a patch is provided. The core is then inserted in the outer casing B and the whole inserted in the mold A and fixed in position by the clamps.

The inner tube E is inflated by connecting the valve stem with a supply of compressed air. As this expands it causes the edges of the bag F to spread so as entirely to fill the outer casing B. Heat is then applied in the usual way and the vulcanizing process of course is the usual one.

The circumferential distention of the outer bag F is an important point because it permits the use of the device even when it does not perfectly fit the tire casing. Yet the bag F securely holds the inner tube E in position even when the outer flap is moved over the inner one to a considerable degree. It simply serves to protect the inner tube and to permit the transmission of the pressure from it to the tire casing and to the patch.

The means for preventing elongation obviously can be applied to a single tube repairing bag in the manner shown in the drawings, according to this invention.

It will be seen that when the inner tube E requires repairs it can be taken out and repaired very readily without interfering with the bag F so that the latter will last for a great length of time. Ordinarily it outlasts several of the inner tubes. The great advantages of it are the adaptability of it to stretched tire casings, its adjustability which permits it to be used when considerably out of shape, and the fact that it will not stretch out in practice. The canvas is relieved of all strain and cannot blow out as the inner tube will expand to the limits of the mold but cannot possibly expand lengthwise beyond the length of the outer bag.

Although we have illustrated and described a single embodiment of the invention, we are aware of the fact that many modifications can be made therein by persons skilled in the art without departing from the scope of the invention as expressed in the claims. Therefore, we do not wish to be limited to all the details of construction herein shown and described, but what we do claim is:—

1. As an article of manufacture, a core for the purpose described, comprising a flexible inner tube and an outer bag formed of frictioned material and having a longitudinal slit to permit it to be expanded circumferentially, and provided with means for preventing its being expanded or extended longitudinally.

2. As an article of manufacture, a core for the purpose described, comprising a flexible inner tube and an outer bag having a longitudinal slit to permit it to be expanded circumferentially, and provided with means for preventing its being expanded or extended longitudinally, said means consisting of non-expansible strips embedded in the material of the bag and extending longitudinally thereof.

3. As an article of manufacture, a core for the purpose described, comprising a flexible inner tube and an outer bag formed of frictioned material and having a longitudinal slit to permit it to be expanded circumferentially, and provided with a plurality of metallic strips embedded in the material of the bag and extending longitudinally thereof on opposite sides, and plates at the ends of the bag for holding the ends of the strips.

4. As an article of manufacture, a core for use in repairing tires comprising an inner tube of flexible and expansible material, and an outer bag expansible circumferentially but not expansible longitudinally, and a loop secured at one end of said outer bag for the purpose described.

5. As an article of manufacture a core for use in repairing tires comprising an inner tube, an outer bag for receiving it, and a hand loop secured at one end of the outer bag for drawing it along the mold.

6. As an article of manufacture, a core bag for the purpose described, provided with a plurality of metallic strips embedded in the material of the bag and extending longitudinally thereof on opposite sides, and plates at the ends of the bag for holding the ends of the strips.

7. The combination in a device of the class described of a bag adapted to be positioned within a tire shoe and inflated to exert pressure internally on the latter during a vulcanizing operation, and a flexible handle attached to said bag so that it may be positioned within the tire shoe during said operation and may be subsequently used to remove the bag from the tire.

8. As an article of manufacture, an air bag for use in repairing tires having a hand loop secured at one end thereof for drawing it along the mold in which it is used.

In testimony whereof we have hereunto set our hands in the presence of two subscribing witnesses.

ALVIN L. JOHNSON.
ALFRED O. ALSTEN.

Witnesses:
ALBERT E. FAY,
C. FORREST WESSON.